(12) United States Patent
Hennings et al.

(10) Patent No.: US 8,584,608 B1
(45) Date of Patent: Nov. 19, 2013

(54) ROLLING TEXTILE PROTECTIVE SYSTEM FOR TEXTILE STRUCTURAL MEMBERS

(75) Inventors: Elsa Johnson Hennings, Ridgecrest, CA (US); Annie Rebecca Hohmann, Ridgecrest, CA (US); Michael Lee Petersen, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 317 days.

(21) Appl. No.: 13/215,545

(22) Filed: Aug. 23, 2011

Related U.S. Application Data

(62) Division of application No. 13/215,107, filed on Aug. 22, 2011, now Pat. No. 8,557,358.

(51) Int. Cl.
*D05B 23/00* (2006.01)

(52) U.S. Cl.
USPC .................................................. 112/475.08

(58) Field of Classification Search
USPC ............ 112/475.01, 161, 162, 163, 401, 402, 112/415, 416, 417
See application file for complete search history.

(56) References Cited

U.S. PATENT DOCUMENTS

| | | | | |
|---|---|---|---|---|
| 1,677,714 A | * | 7/1928 | Frease | 138/115 |
| 2,551,710 A | * | 5/1951 | Slaughter | 362/355 |
| 3,130,630 A | * | 4/1964 | Dawes | 87/2 |
| 3,266,529 A | * | 8/1966 | Bunger | 139/384 R |
| 3,332,446 A | * | 7/1967 | Mann | 138/114 |
| 3,581,776 A | * | 6/1971 | Sheahan | 138/108 |
| 3,657,741 A | * | 4/1972 | Blanco | 2/59 |
| 3,709,721 A | * | 1/1973 | King | 442/110 |
| 3,902,196 A | * | 9/1975 | Reinfandt | 2/2.5 |
| 3,960,651 A | * | 6/1976 | Kometani et al. | 162/105 |
| 4,281,211 A | * | 7/1981 | Tatum et al. | 174/36 |
| 4,643,229 A | * | 2/1987 | Hickin | 138/109 |
| 4,654,235 A | * | 3/1987 | Effenberger et al. | 427/407.3 |
| 4,663,207 A | * | 5/1987 | Kupersmit | 428/119 |
| 4,731,505 A | * | 3/1988 | Crenshaw et al. | 174/107 |
| 4,906,496 A | * | 3/1990 | Hosono et al. | 428/36.9 |
| 4,929,478 A | * | 5/1990 | Conaghan et al. | 428/35.1 |
| 4,939,778 A | * | 7/1990 | Tomberlin | 379/438 |

(Continued)

OTHER PUBLICATIONS

Michael L. Petersen, Presentation to 21st AIAA Aerodynamic Decelerator Systems Technology Conference and Seminar 2011, May 25, 2011; Trinity College; Dublin, Ireland.

(Continued)

*Primary Examiner* — Danny Worrell
(74) *Attorney, Agent, or Firm* — James M. Saunders

(57) ABSTRACT

A rolling textile protective system for textile structural members includes n number of concentric sleeves having void spaces therebetween. The n number of concentric sleeves are concentrically positioned about a common axis. N number of concentric sleeves includes an inner sleeve, a middle sleeve, and an outer sleeve. The outer sleeve is a polytetrafluoroethylene cloth layer. A first fiberglass cloth layer is adjacent to the polytetrafluoroethylene cloth layer. A polybenzimidazole cloth layer is adjacent to the fiberglass cloth layer. A para-aramid synthetic fibrous cloth layer is adjacent to the polybenzimidazole cloth layer. A second fiberglass cloth layer is adjacent to the para-aramid synthetic fibrous cloth layer. The polytetrafluoroethylene cloth layer, the first fiberglass cloth layer, the polybenzimidazole cloth layer, the para-aramid synthetic fibrous cloth layer, and the second fiberglass cloth layer are stitched together. The n number of concentric sleeves are stitched together and to a textile structural member.

11 Claims, 2 Drawing Sheets

(56) References Cited

U.S. PATENT DOCUMENTS

| | | | | |
|---|---|---|---|---|
| 5,082,721 | A * | 1/1992 | Smith et al. | 442/289 |
| 5,178,923 | A * | 1/1993 | Andrieu et al. | 428/36.1 |
| 5,273,490 | A * | 12/1993 | Stewart et al. | 464/173 |
| 5,402,832 | A * | 4/1995 | Kamper et al. | 139/387 R |
| 5,497,809 | A * | 3/1996 | Wolf | 138/113 |
| 5,580,622 | A * | 12/1996 | Lockshaw et al. | 428/34.1 |
| 5,742,002 | A * | 4/1998 | Arredondo et al. | 174/29 |
| 5,924,130 | A * | 7/1999 | Fragomeli | 2/16 |
| 5,964,400 | A * | 10/1999 | Varano et al. | 229/403 |
| 5,975,149 | A * | 11/1999 | Lee et al. | 139/383 A |
| 6,074,714 | A * | 6/2000 | Gottfried | 428/34.6 |
| 6,085,970 | A * | 7/2000 | Sadlier | 229/403 |
| 6,112,770 | A * | 9/2000 | Walsh et al. | 138/110 |
| 6,192,520 | B1 * | 2/2001 | Underwood et al. | 2/93 |
| 6,257,485 | B1 * | 7/2001 | Sadlier et al. | 229/403 |
| 6,521,465 | B2 * | 2/2003 | Stimpson | 436/518 |
| 6,635,322 | B1 * | 10/2003 | Korsgaard | 428/34.5 |
| 6,821,638 | B2 * | 11/2004 | Obeshaw | 428/593 |
| 6,893,733 | B2 * | 5/2005 | Obeshaw | 428/593 |
| 6,949,282 | B2 * | 9/2005 | Obeshaw | 428/131 |
| 6,978,643 | B2 * | 12/2005 | Akers et al. | 66/170 |
| 7,018,691 | B2 * | 3/2006 | McNeil | 428/36.91 |
| 7,216,678 | B2 * | 5/2007 | Baer | 139/384 R |
| 7,271,344 | B1 * | 9/2007 | Stutzman et al. | 174/113 R |
| 7,395,680 | B2 * | 7/2008 | Baer et al. | 66/170 |
| 7,600,539 | B2 * | 10/2009 | Malloy et al. | 139/387 R |
| 7,647,946 | B2 * | 1/2010 | Mirmand et al. | 138/110 |
| 7,968,190 | B2 * | 6/2011 | Clough | 428/364 |
| 8,070,705 | B2 * | 12/2011 | Goodwin | 602/60 |
| 2002/0104576 | A1 * | 8/2002 | Howland | 139/421 |
| 2004/0175567 | A1 * | 9/2004 | Huang et al. | 428/393 |
| 2004/0219851 | A1 * | 11/2004 | Sahlin et al. | 442/254 |
| 2005/0019597 | A1 * | 1/2005 | Obeshaw | 428/593 |
| 2005/0124249 | A1 * | 6/2005 | Uribarri | 442/304 |
| 2005/0144696 | A1 * | 7/2005 | Lack et al. | 2/69 |
| 2007/0207693 | A1 * | 9/2007 | Tsukuda et al. | 442/381 |
| 2008/0057249 | A1 * | 3/2008 | Herrington | 428/36.91 |
| 2010/0260957 | A1 * | 10/2010 | Xie | 428/36.91 |
| 2011/0129657 | A1 * | 6/2011 | Clough | 428/219 |
| 2011/0167532 | A1 * | 7/2011 | Carlson et al. | 2/69 |

OTHER PUBLICATIONS

E. Hennings, M. Petersen, A. Hohmann, Protection of a Textile Parachute Riser from Temperature and Abrasion Using a Textile Cover System, May 16, 2011; AIAA vol. 2 Conf Proceeding.

* cited by examiner

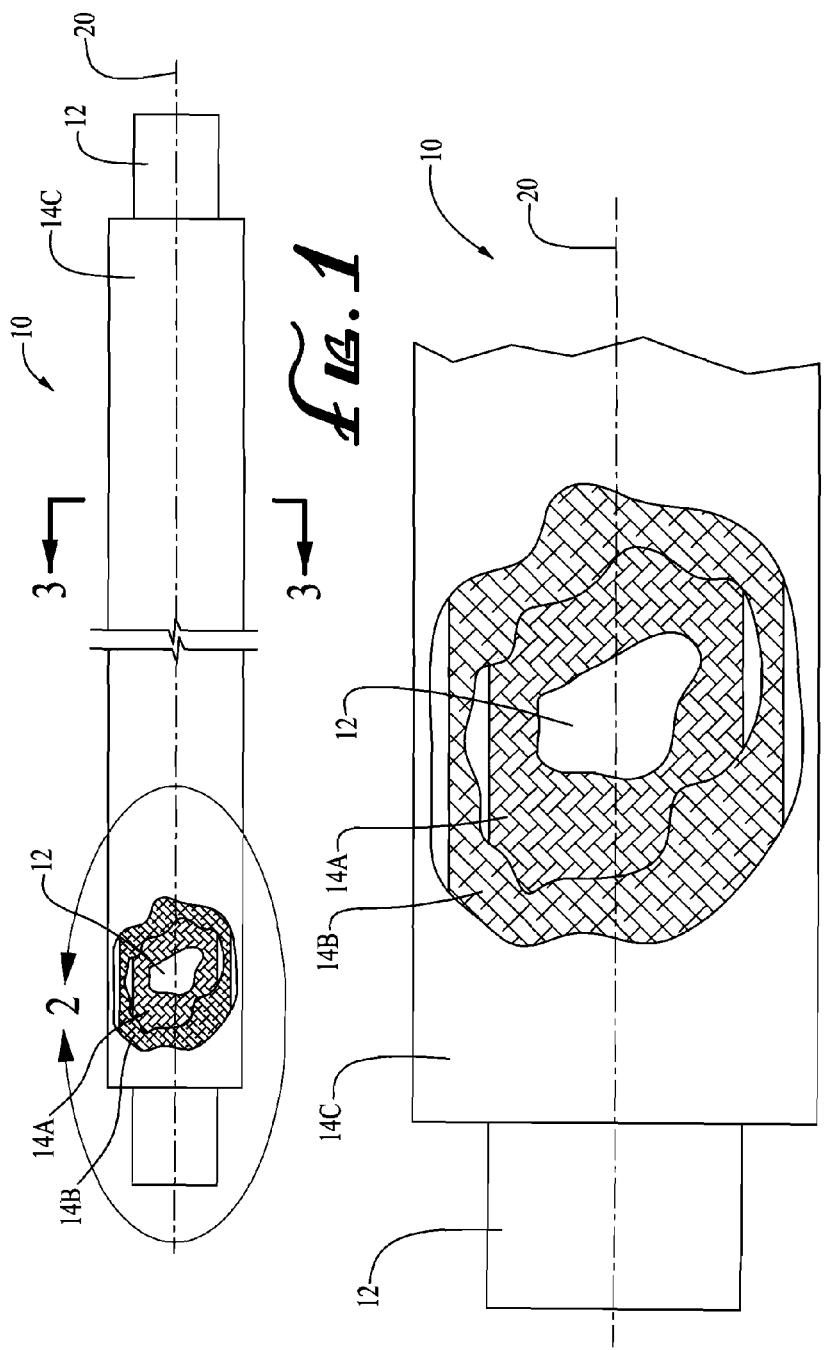

ROLLING TEXTILE PROTECTIVE SYSTEM FOR TEXTILE STRUCTURAL MEMBERS

CROSS-REFERENCE TO RELATED APPLICATIONS

This is a divisional application, claiming the benefit of parent non-provisional application Ser. No. 13/215,107 filed on Aug. 22, 2011 now U.S. Pat. No. 8,557,358, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a protective apparatus for structural members, and more particularly, to a rolling textile protective system for textile structural members.

BRIEF DESCRIPTION OF THE DRAWINGS

FIG. 1 is a plan view of a rolling textile protective system for textile structural members, according to embodiments of the invention.

FIG. 2 is an exploded plan view of a partial cutaway of a rolling textile protective system for textile structural members, according to embodiments of the invention.

Figure 3:
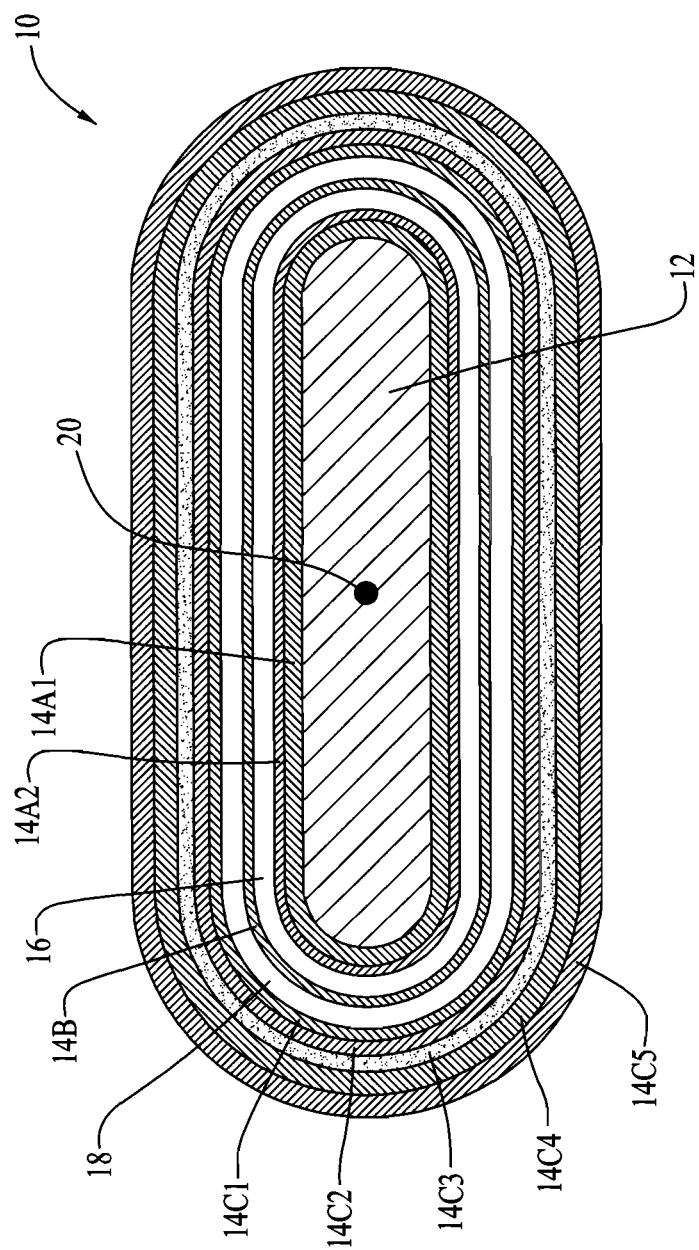
FIG. 3 is a section view of a rolling textile protective system for textile structural members, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to a protective apparatus for structural members, and more particularly, to a rolling textile protective system for textile structural members. Typically, steel cable is used for structural members in which high temperatures or abrasion are of concern. The penalty for using heavy steel cable in aircraft or spacecraft applications is much lower payload weight. Therefore, it is desirous to find a rolling textile protective system for a textile structural member allowing textile materials to be used as structural members, thus increasing available payload.

Typically, flexible structural material that may contact hot or sharp surfaces are made from heavy steel cable to prevent damage or failure of structural members. For ground-based applications this is not detrimental, but for aircraft and spacecraft, the weight penalty can be severe. There are many examples of steel cable structural members used in naval aviation and spacecraft today such as, for example, parachute risers for spin/stall recovery of aircraft and re-entry of spacecraft.

Many new high-strength, low weight textile materials have been developed in the last several years that can replace steel cable as a structural member while saving considerable weight. Textile products, however, are more susceptible to heat and abrasion damage than steel, so their use has been limited to applications in which contact with hot or sharp surfaces does not occur. Currently, when textile structural members are used in high temperature and abrasive environments, the textile structural members are protected with thick felt wrapping around the structural member with steel braided sleeving covering the felt. This combination is of benefit only during brief, glancing contact with hot or sharp surfaces. When subjected to direct abrasion, however, the steel braid and felt are cut through with very little resistance, with the cut ends of the steel adding to the damage of the textile structural member underneath.

Instead of the traditional steel cables and other heavy protective devices, embodiments of the invention use strong, flexible, lightweight, abrasion, and heat resistant materials in harsh conditions previously requiring steel, thus resulting in a substantial weight decrease. This technique is useful in many parachute and aircraft applications. An additional benefit of this invention for parachute risers is the reduction in deployment risk and consequent increase in system reliability. When heavy structural members including cable and cable terminations are deployed at high speed, the resulting snatch loads inherent with intermediate masses can result in parachute failure unless the deployment is carefully controlled, which adds complexity and reduces reliability of the system.

Although embodiments of the invention are described in considerable detail, including references to certain versions thereof, other versions are possible. Examples of other versions include performing alternate combinations and sequencing of the materials to optimize protection based on the specific contact environment. Therefore, the spirit and scope of the appended claims should not be limited to the description of versions included herein.

In the accompanying drawings, like reference numbers indicate like elements. FIG. 1 illustrates a plan view of a rolling textile protective system for a textile structural member, according to embodiments of the invention. FIG. 2 is an exploded view of the partial cutaway plan view shown in FIG. 1 of a rolling textile protective system for textile structural members, according to embodiments of the invention. Reference character 10 depicts an apparatus of embodiments of the invention.

A lightweight textile structural member 12 is shown with a lightweight, compressible textile protective cover (illustrated in greater detail in FIG. 3) surrounding the lightweight textile structural member. The lightweight, compressible textile protective cover may also be referred to as a sleeve and a plurality of sleeves, without detracting from the merits of the invention.

The protective cover uses a plurality of sleeves manufactured from a plurality of heat and abrasion resistant textile materials, the sleeves are fabricated with sufficient looseness that they can move with respect to the underlying textile structural member when subjected to a force in a multitude of transverse or axial directions. The ability to move separately, along with the particular combination of textile cover materials, prevents damage to the textile structural member. This concept prevents heat and abrasion damage from a Kevlar® parachute riser subjected to over 16,000 pounds of normal force against a 1200 degrees Fahrenheit, half-inch diameter rod in a sliding abrasive action.

FIG. 3 illustrates a section view of a rolling textile protective system for a textile structural member, according to embodiments of the invention. Any number of structural members 12 may be protected by the apparatus 10. One structural member 12 is shown in FIG. 3 for simplicity.

A person having ordinary skill in the art will recognize that Kevlar® is the registered trademark for a para-aramid synthetic fiber, related to other aramids including Nomex® and Technora®. Developed at DuPont in 1965, this high strength material was first commercially used in the early 1970s as a replacement for steel in racing tires. Typically, it is spun into ropes or fabric sheets that can be used as such or as an ingredient in composite material components.

Currently, Kevlar® has many applications, ranging from bicycle tires and racing sails to body armor because of its high tensile strength-to-weight ratio. By this measure it is five times stronger than steel on an equal weight basis. [http://en.wikipedia.org/wiki/Kevlar].

Similarly, a person having ordinary skill in the art will recognize that a polytetrafluoroethylene (PTFE) is a synthetic fluoropolymer of tetrafluoroethylene having numerous applications. PTFE is well known by the DuPont brand name Teflon®.

PTFE is a fluorocarbon solid, as it is a high-molecular-weight compound consisting wholly of carbon and fluorine. PTFE is hydrophobic: neither water nor water-containing substances wet PTFE, as fluorocarbons demonstrate mitigated London dispersion forces due to the high electronegativity of fluorine. PTFE has one of the lowest coefficients of friction against any solid. PTFE's coefficient of friction of 0.05 to 0.10. [http://en.wikipedia.org/wiki/Polytetrafluoroethylene].

Likewise, it will be recognized that polybenzimidazole (PBI) is a synthetic fiber having an extremely high melting point that also does not readily ignite, because of its exceptional thermal and chemical stability. The Federal Trade Commission defines PBI as a manufactured fiber where the fiber-forming substance is a long-chain aromatic polymer having recurring imidazole groups as an integral part of the polymer chain. Kermel®, a polyamidoimide, is a related high performance polymer. PBI is used to fabricate high-performance protective apparel including firefighter turnout coats and suits, astronaut space suits, high temperature protective gloves, welders' apparel, race driver suits, braided packings, and aircraft wall fabrics. [http://en.wikipedia.org/wiki/Polybenzimidazole].

Similarly, fiberglass is recognized in the art as a fiber reinforced polymer made of a plastic matrix reinforced by fine fibers of glass. Fiberglass is also referred to as glass-reinforced plastic (GRP), glass fiber-reinforced plastic (GFRP), and as GFK (for Glasfaserverstärkter Kunststoff). Fiberglass is a lightweight, extremely strong, and robust material. Although strength properties are somewhat lower than carbon fiber and it is less stiff, the material is typically far less brittle, and the raw materials are much less expensive. Its bulk strength and weight properties are also very favorable when compared to metals, and it can be easily formed using molding processes. Fiberglass is commonly used in boats, automobiles, baths, hot tubs, water tanks, roofing, pipes, cladding, and external door skins. [http://en.wikipedia.org/wiki/Fiberglass].

Embodiments of the invention generally relate to a protective system for a structural member 12, including: at least two sleeves 14A through 14C, where at least two sleeves are equal in amount to a predetermined number "n." Each of at least two sleeves 14A through 14C are associated in a predetermined position with each other. At least one void space 16 and 18 is associated with the at least two sleeves 14A through 14C, where at least one void space is equal in amount to the predetermined number "n" minus 1. Each of at least one void space 16 and 18 is located between a successive pair of at least two sleeves 14A through 14C.

At least two sleeves 14A through 14C are positioned concentrically about a common axis 20. The structural member 12 being protected is a lightweight textile structural member. When the predetermined number "n" is equal to three, at least two sleeves 14A through 14C include an inner sleeve 14A, a middle sleeve 14B, and an outer sleeve 14C.

In parachute applications, a person having ordinary skill in the art will understand that the structural member 12 is often referred to as a riser.

In embodiments, at least two sleeves 14A through 14C are compressible, flexible, lightweight, heat resistant, abrasion resistant, and any combination thereof. Application-specific conditions guide the appropriate selection of materials making up at least two sleeves 14A through 14C.

At least one void space 16 and 18 provides appropriate looseness between each of at least two sleeves 14A through 14C based on application-specific requirements associated with the geometry of the structural member 12 being protected. The appropriate looseness allows all but the inner sleeve 14A of at least two sleeves 14A through 14C to roll axially around the structural member 12 and the common axis 20 and translate in linear fashion along the common axis.

Another embodiment of the invention generally relates to a rolling cover for a textile structural member 12, including: an inner sleeve 14A, a middle sleeve 14B associated with the inner sleeve by a first void space 16, and an outer sleeve 14C associated with the middle sleeve by a second void space 18.

The inner sleeve 14A, the middle sleeve 14B, and the outer sleeve 14C are compressible, flexible, lightweight, heat resistant, abrasion resistant, and any combination thereof. Application-specific conditions guide the appropriate selection of materials making up the inner sleeve 14A, the middle sleeve 14B, and the outer sleeve 14C.

The inner sleeve 14A, the middle sleeve 14B, and the outer sleeve 14C are positioned concentrically about a common axis 20. The textile structural member 12 is lightweight.

The first void space 16 and the second void space 18 provide appropriate looseness between the inner sleeve 14A, the middle sleeve 14B, and the outer sleeve 14C based on application-specific requirements associated with the geometry of the textile structural member 12 being protected.

The appropriate looseness allows the middle sleeve 14B and the outer sleeve 14C to roll axially around the inner sleeve 14A, the textile structural member 12, and the common axis 20 and translate in linear fashion along the common axis.

Certain components, as discussed below, associated with at least two sleeves 14A through 14C are dual layers of material, although they are shown on FIG. 3 as singular layers for simplified viewing. Additionally, component material selection and orientation are chosen to reduce friction between the structural member 12 and the contact surface of at least two sleeves 14A through 14C, also referred to as the inner sleeve 14A, the middle sleeve 14B, and the outer sleeve 14C. Friction reduction allows the rolling action and translation discussed above. Similarly, component material selection and orientation is chosen to result in component compressibility, and resistance to extreme abrasion, and/or thermal conditions, or a combination of both.

The inner sleeve 14A includes, but is not limited to, a Kevlar® cloth layer 14A1 and a dual Teflon® cloth layer 14A2, wherein the Kevlar® cloth layer is stitched to the dual Teflon® cloth layer in a predetermined layered orientation.

The middle sleeve 14B includes, but is not limited to, two layers of Teflon® cloth stitched together in a predetermined layered orientation.

The outer sleeve 14C is a protective cover, including, but not limited to, a dual Teflon® cloth layer 14C1, a first dual fiberglass cloth layer 14C2 associated with the dual Teflon® cloth layer, a dual polybenzimidazole cloth layer 14C3 associated with the dual Teflon® cloth layer, a dual Kevlar® cloth layer 14C4 associated with the dual polybenzimidazole cloth layer, and a second dual fiberglass cloth layer 14C5 associated with the dual Kevlar® cloth layer. The dual Teflon® cloth layer 14C1, the first dual fiberglass cloth layer 14C2, the dual polybenzimidazole cloth layer 14C3, the dual Kevlar® cloth layer 14C4, and the second dual fiberglass cloth layer 14C5 are stitched together in a predetermined layered orientation.

The diameters associated with the inner sleeve 14A, the middle sleeve 14B, and the outer sleeve 14C are appropriately-selected to allow the inner sleeve to be positioned around the structural member 12, the middle sleeve to be positioned around the inner sleeve, and the outer sleeve to be positioned around the middle sleeve.

In embodiments, the inner sleeve 14A is a Kevlar® cloth layer 14A1 and a dual Teflon® cloth layer 14A2, wherein the Kevlar® cloth layer is stitched to the dual Teflon® cloth layer in a predetermined layered orientation.

In embodiments, the middle sleeve 14B is two layers of Teflon® cloth stitched together in a predetermined layered orientation. In embodiments, the outer sleeve 14C is a dual Teflon® cloth layer 14C1, a first dual fiberglass cloth layer 14C2 associated with the dual Teflon® cloth layer, a dual polybenzimidazole cloth layer 14C3 associated with the dual Teflon® cloth layer, a dual Kevlar® cloth layer 14C4 associated with the dual polybenzimidazole cloth layer, and a second dual fiberglass cloth layer 14C5 associated with the dual Kevlar® cloth layer.

The dual Teflon® cloth layer 14C1, the first dual fiberglass cloth layer 14C2, the dual polybenzimidazole cloth layer 14C3, the dual Kevlar® cloth layer 14C4, and the second dual fiberglass cloth layer 14C5 are stitched together in a predetermined layered orientation.

One having ordinary skill in the art will recognize that a single sleeve may also be used without detracting from the merits or generality of the invention. When a single sleeve is used, one void space is located between the structural member 12 and the single sleeve.

Another embodiment of the invention relates to a method of making a protective system for a structural member 12, including: providing at least two sleeves 14A through 14C, where at least two sleeves are equal in amount to a predetermined number "n." Each of at least two sleeves 14A through 14C is associated in a predetermined position with each other by being concentrically positioned about a common axis 20.

At least one void space 16 and 18 is provided. At least one void space 16 and 18 is equal in amount to the predetermined number "n" minus 1. Each of at least one void space 16 and 18 is located between a successive pair of at least two sleeves 14A through 14C.

A fabricator stitches each of at least two sleeves 14A through 14C together and to the structural member 12 in the predetermined position to provide an appropriate looseness between each of at least two sleeves based on application-specific requirements associated with the geometry of the structural member being protected.

The structural member 12 is a lightweight textile structural member. When the predetermined number "n" is equal to 3, at least two sleeves 14A through 14C includes an inner sleeve 14A, a middle sleeve 14B, and an outer sleeve 14C. In embodiments, at least two sleeves 14A through 14C are compressible, flexible, lightweight, heat resistant, abrasion resistant, and any combination thereof. Application-specific conditions guide the appropriate selection of at least two sleeves 14A through 14C.

The appropriate looseness allows all but the inner sleeve 14A of at least two sleeves 14A through 14C to roll axially around the structural member 12 and the common axis 20 and translate in linear fashion along the common axis. The diameters associated with the inner sleeve 14A, the middle sleeve 14B, and the outer sleeve 14C are appropriately-selected to allow the inner sleeve to be positioned around the structural member 12, the middle sleeve to be positioned around the inner sleeve, and the outer sleeve to be positioned around the middle sleeve.

Another embodiment of the invention relates to a method of making a rolling cover for a textile structural member 12, including: providing an inner sleeve 14A, providing a middle sleeve 14B associated with the inner sleeve by a first void space 16, providing an outer sleeve 14C associated with the middle sleeve by a second void space 18, and associating the inner sleeve, the middle sleeve, and the outer sleeve in a predetermined position with each other and the textile structural member by concentrically positioning the inner sleeve, the middle sleeve, and the outer sleeve about the textile structural member on a common axis 20.

The common axis 20 is common to the textile structural member 12 and each of the sleeves 14A through 14C and the first void space 16 and the second void space 18, where the association is by at least one mattress stitch.

The first void space 16 and the second void space 18 provide appropriate looseness between the inner sleeve 14A, the middle sleeve 14B, and the outer sleeve 14C based on application-specific requirements associated with the geometry of the textile structural member 12 being protected. The appropriate looseness allows the middle sleeve 14B and the outer sleeve 14C to roll axially around the inner sleeve 14A, the textile structural member 12, and the common axis 20 and translate in linear fashion along the common axis.

The diameters associated with the inner sleeve 14A, the middle sleeve 14B, and the outer sleeve 14C are appropriately-selected to allow the inner sleeve to be positioned around the textile structural member 12, the middle sleeve to be positioned around the inner sleeve, and the outer sleeve to be positioned around the middle sleeve.

In embodiments, the inner sleeve 14A includes a Kevlar® cloth layer 14A1 and a dual Teflon® cloth layer 14A2. The Kevlar® cloth layer 14A1 is stitched to the dual Teflon® cloth layer 14A2 in a predetermined layered orientation. In embodiments, the middle sleeve 14B includes two layers of Teflon® cloth stitched together in a predetermined layered orientation.

In embodiments, the outer sleeve 14C includes a dual Teflon® cloth layer 14C1, a first dual fiberglass cloth layer 14C2 associated with the dual Teflon® cloth layer, a dual polybenzimidazole cloth layer 14C3 associated with the dual fiberglass cloth layer, a dual Kevlar® cloth layer 14C4 associated with the dual polybenzimidazole cloth layer, and a second dual fiberglass cloth layer 14C5 associated with the dual Kevlar® cloth layer. The dual Teflon® cloth layer 14C1, the first dual fiberglass cloth layer 14C2, the dual polybenzimidazole cloth layer 14C3, the dual Kevlar® cloth layer 14C4, and the second dual fiberglass cloth layer 14C5 are stitched together in a predetermined layered orientation.

Unless specifically noted, any appropriate fastening device may be used. One example of an appropriate fastening device is a mattress stitch. A person having ordinary skill in the art will recognize that a mattress stitch is a length of stitching loosely coupling each of at least two sleeves 14A through 14C and the structural member 12. Similarly, glue is also an appropriate fastening device.

Further research includes, but is not limited to, identifying other appropriate materials to optimize protection based on the specific contact environment.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of making a protective system for a structural member, comprising:
   providing n number of concentric sleeves concentrically positioned about a common axis, said n number of concentric sleeves having
   void spaces therebetween, wherein said n is equal to 3, said n number of concentric sleeves comprises an inner sleeve, a middle sleeve, and an outer sleeve, wherein said outer sleeve comprises a polytetrafluoroethylene cloth layer, a first fiberglass cloth layer adjacent said polytetrafluoroethylene cloth layer, a polybenzimidazole cloth layer adjacent said fiberglass cloth layer, a para-aramid synthetic fibrous cloth layer adjacent said polybenzimidazole cloth layer, a second fiberglass cloth layer adjacent said para-aramid synthetic fibrous cloth layer, wherein said polytetrafluoroethylene cloth layer, said first fiberglass cloth layer, said polybenzimidazole cloth layer, said para-aramid synthetic fibrous cloth layer, and said second fiberglass cloth layer are stitched together; and
   stitching each of said n number of concentric sleeves together and to a structural member, said structural member having said common axis spanning said structural member longitudinally.

2. The method according to claim 1, wherein said structural member is a textile structural member.

3. The method according to claim 1, wherein said inner sleeve comprises a para-aramid synthetic fibrous cloth layer and a polytetrafluoroethylene cloth layer, wherein said para-aramid synthetic fibrous cloth layer is stitched to said polytetrafluoroethylene cloth layer.

4. The method according to claim 1, wherein said middle sleeve comprises two layers of polytetrafluoroethylene cloth stitched together.

5. The method according to claim 1, wherein all but said inner sleeve of said n number of concentric sleeves roll axially around said structural member and said common axis and translate in linear fashion along said common axis.

6. The method according to claim 1, wherein the diameters of said inner sleeve, said middle sleeve, and said outer sleeve are configured to allow said inner sleeve to be positioned around said structural member, said middle sleeve to be positioned around said inner sleeve, and said outer sleeve to be positioned around said middle sleeve.

7. A method of making a rolling cover for a textile structural member, comprising:
   providing an inner sleeve;
   providing a middle sleeve concentric about said inner sleeve, wherein a first void space is positioned between said inner sleeve and said middle sleeve;
   providing an outer sleeve concentric about said middle sleeve, whereby a second void space is positioned between said middle sleeve and said outer sleeve, wherein said outer sleeve comprises a polytetrafluoroethylene cloth layer, a first fiberglass cloth layer adjacent said polytetrafluoroethylene cloth layer, a polybenzimidazole cloth layer adjacent said fiberglass cloth layer, a para-aramid synthetic fibrous cloth layer adjacent said polybenzimidazole cloth layer, a second fiberglass cloth layer adjacent said para-aramid synthetic fibrous cloth layer, wherein said polytetrafluoroethylene cloth layer, said first fiberglass cloth layer, said polybenzimidazole cloth layer, said para-aramid synthetic fibrous cloth layer, and said second fiberglass cloth layer are stitched together; and
   concentrically positioning and stitching said inner sleeve, said middle sleeve, and said outer sleeve together and to a textile structural member, said textile structural member having a longitudinal axis, said longitudinal axis common to each of said inner sleeve, said middle sleeve, and said outer sleeve.

8. The method according to claim 7, wherein said inner sleeve comprises a para-aramid synthetic fibrous cloth layer and a polytetrafluoroethylene cloth layer, wherein said para-aramid synthetic fibrous cloth layer is stitched to said polytetrafluoroethylene cloth layer.

9. The method according to claim 7, wherein said middle sleeve comprises two layers of polytetrafluoroethylene cloth stitched together.

10. The method according to claim 7, wherein said middle sleeve and said outer sleeve roll axially around said inner sleeve, said textile structural member, and said common axis and translate in linear fashion along said common axis.

11. The method according to claim 7, wherein the diameters of said inner sleeve, said middle sleeve, and said outer sleeve are configured to allow said inner sleeve to be positioned around said textile structural member, said middle sleeve to be positioned around said inner sleeve, and said outer sleeve to be positioned around said middle sleeve.

* * * * *